United States Patent Office 3,790,657
Patented Feb. 5, 1974

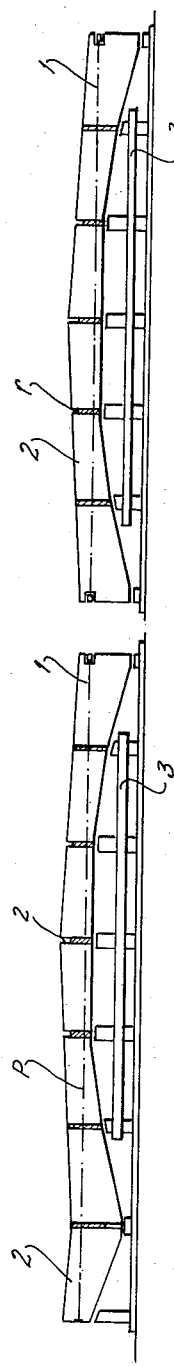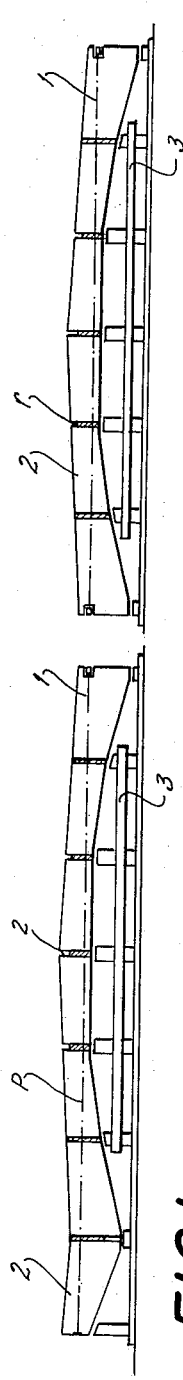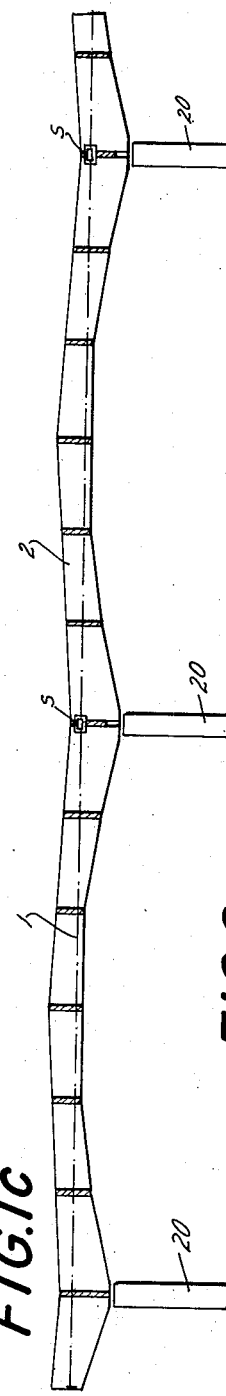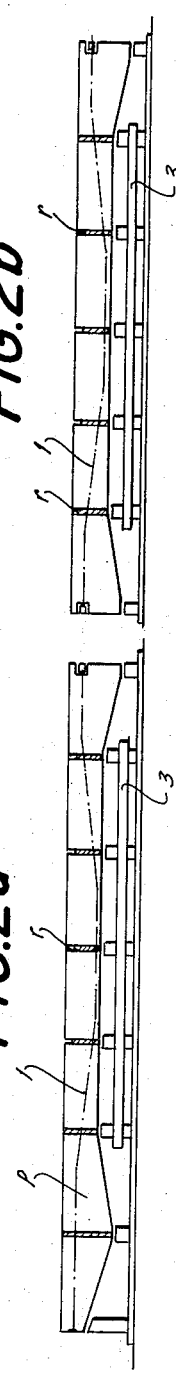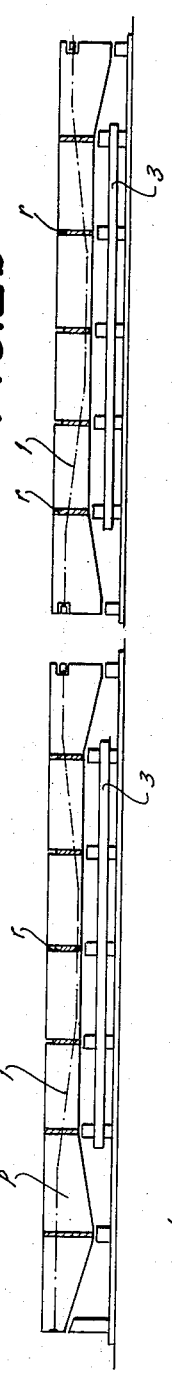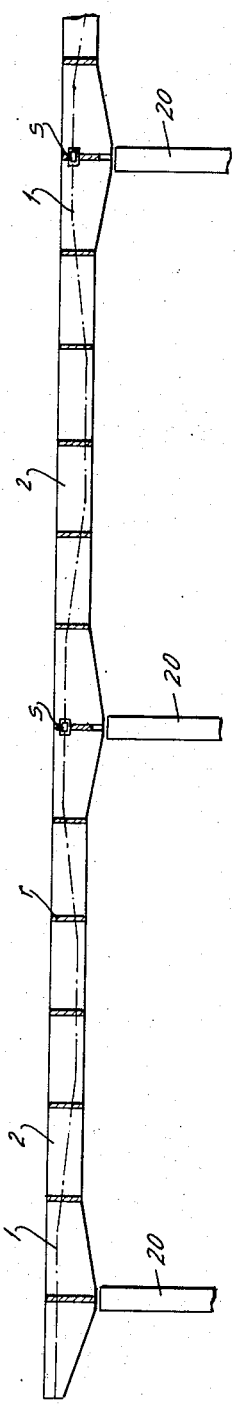

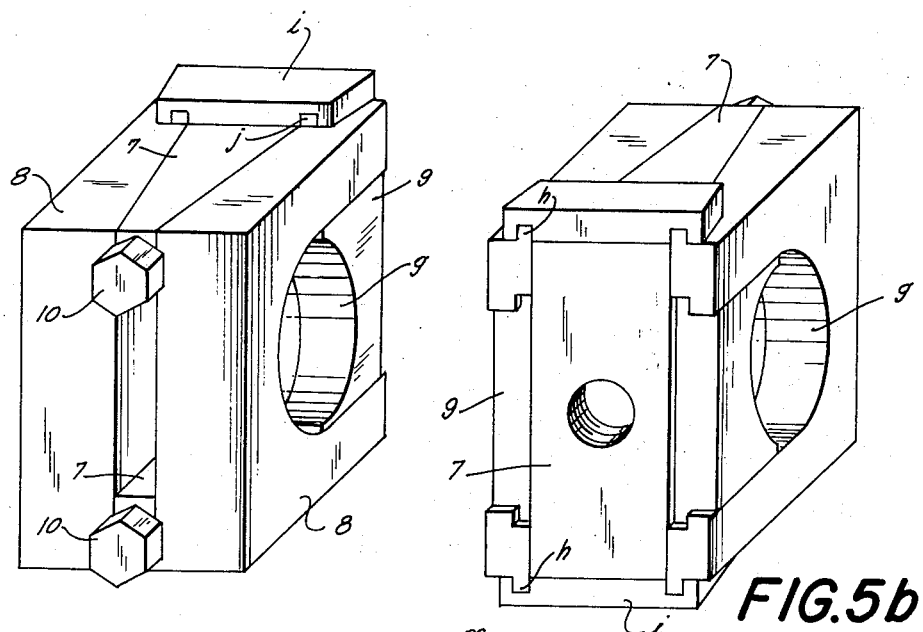

3,790,657
METHOD OF AND DEVICE FOR THE FORMATION OF BEAM STRUCTURES
Constantin Leonte, Iasi, Rumania, assignor to Institutul Politehnic Iasi, Iasi, Rumania
Filed Dec. 15, 1971, Ser. No. 208,293
Int. Cl. E04c 3/10, 5/08
U.S. Cl. 264—228
1 Claim

ABSTRACT OF THE DISCLOSURE

Beams are assembled at grade level from a multiplicity of precast concrete elements which are cemented together at their joints by mortar and, after the mortar has hardened, tension is applied to a cable extending through a channel of the beam formed by aligned passages of the individual elements. The tension is applied by relatively displacing wedge members of a removable assembly at an emergent end of the cable and the beams can then be erected. Externally threaded rings on the emergent ends of the cables of a pair of spacedly aligned beams are threaded into a pipe after a mortar between the beams has hardened, thereupon transmitting tensile force between the cables. The wedge assembly is then removed and the space around the cables and the pipe, and the space occupied by the wedge assembly, is filled with concrete.

---

The invention refers to a procedure and means of assembling by prestressing of some resisting structures composed of prefabricated concrete units.

There are known some assembling procedures by prestressing, which consist of adjacent settlement of prefabricated concrete units, on scaffolding so that the continuity of channels for post-tensioned reinforcement be assured, as well as the filling in—with mortar—of the joints between units, and the introduction in sewers of the reinforcements which are to be pretensioned and blocked after mortar hardening, obtaining thus resisting prestressed concrete structures.

These procedures present many disadvantages among which more important are the following: a great consumption of material, of manual labor and of implements for working out and taking down the scaffoldings, the diminishing of shunting capacity of transport and raising-implements, increasing of execution time, a great consumption of high strength steel due to the great frictions which are taking place when pretensioned reinforcements have both large lengths and polygonal or curviliniar lay-out, as well as due to more severe conditions referring to cracking to transferring and in the service, at joints between units a more difficult execution of reinforcement pretensioning in conditions of the whole structure, etc.

There are also known some procedures consisting of assembling by prestressing into two stages of the structures composed of concrete prefabricated units. During the first stage the units are assembled at ground level by prestressing into members (beams, columns etc.) of the resisting structure. During the second stage these members are mounted in resisting structure, and the continuity of prestressing is achieved by means of some cap cables.

These procedures eliminate part of the disadvantages of the first procedures by: removing the scaffoldings bearing the resisting structure before its prestressing, the execution—at the ground-level—of a part of the prestressing operations, diminishing of tension losses due to friction through decreasing the lay-out lengths of pretensioned reinforcement, but the other disadvantages refering to the increasing consumption of high strength steel due to a less rational positioning of pretensioned reinforcement, in order to satisfy the more severe requirements regarding the cracking, at transfer in joints between concrete units and between the members made of units during the first stage, are maintained, and, besides, the disadvantage of using the cap cables conducting to an additional consumption of high strength steel, of anchorages, of manual labor, and pretensioning and injection implements etc., as well as the disadvantage of pretensioning those cap cables into resisting structure, being also necessary some erecting-scaffolds and raising implements etc. Also, the danger of accidents when pretensioning is made at high levels, is greater compared with the case when pretensioning is performed at the ground level.

The present invention eliminates the mentioned disadvantages by the fact that, in order to get resisting structures made up of prefabricated concrete units, assembled by prestressing with posttensioned reinforcement, arranged after identical lay-out or very similar to those used at prestressed concrete structures put into execution by direct casting of the concrete at the final dimensions, in a first stage the concrete units are assembled at the ground, level in prestressed concrete members, by arranging the concrete units end to end so that the continuity of every sewer for reinforcement be assured letting the necessary joint-spaces to remain between them which are to be filled up with cement-mortar on such depths that each cross-section through the partially filled up spaces could have one limit of its core, right at the application point level of prestressing force at transfer after the mortar hardening in the joint-spaces, by introducting the cables into openings which are pretensioned and blocked by means of steel anchorages, of ring and cone type, after having previously disposed, below each anchorage, some transferring devices made up of metallic wedges, cylindrical members with interior hollows for temporary support of the anchorages and cylindrical nuts of the devices that joint-together the reinforcements, after prestressing and blocking the reinforcements the space between the concrete-units are completely filled up with mortar; during the second stage the prestressed members with post-tensioned reinforcement without any mold are mounted into structure by pump them end to end so that the anchorages have the found vis-à-vis to each other and on the same axes, and in order to let between the members the necessary joint-spaces which are to be filled up with concrete or mortar, depending on their thickness on such a depth that each cross section through these spaces should have the core limit closer to the reinforcement at the level of the application point of the prestressing force at transfer, while the couples of reinforcements are patched up by coupling of the anchorages with the connection devices, after hardening of mortar in joints, during a new stage—the stressing of the connection devices of reinforcement being performed and thus the simultaneous introduction of an initial favorable stress-state into the joint-spaces between the assembled members of the resisting structure, by transferring the prestressing forces developed by each cable on the concrete-members which have been assembled, from the anchorage levels to connection devices and to the joint-spaces levels between the members by the extraction of the transfer devices from below the anchorages, by means of an usual jack, the injection of channels with mortar and filling with concrete the groove in which are found the connection devices being performed after completely filling up with mortar the spaces between members, after the hardening of mortar and after the obtained structures has been loaded, with permanent loads.

For the achievement of the assembling procedure by prestressing, according to this invention, are necessary:

Connection devices of the reinforcements, composes of one cylindrical piece made of steel pipe having an interior diameter of 2-3 mm. greater than the external diameter of the anchorages, threaded insides at the ends, and having a hole in the lateral wall for checking up the injection, and from two nuts in shape of cylindrical washers on threaded on the external lateral surface and on one of the frontal surfaces being provided with cylindrical holes or radial notches of rectangular section, fixed wrench being used for their screwing up, each wrench being equipped with pegs or rectangular ribs on one of their faces, the nuts being placed below the anchorages before pretensioning each reinforcement on cylindrical pieces having an inner hole, of temporary bearing for anchorages, which exterior diameter is 2-3 mm. less than of the inner hole diameter of the nuts, the patching up of reinforcements in the prestressed concrete members which are to be assembled into the prestressed concrete resistance-structure, being made by screwing up the cylindrical pieces of the patch devices, with the nuts existing behind the anchorages from one of each of the prestressed concrete members, the successive arrangement of prestressed concrete members being carried out so that, during the setting up the anchorages placed at the end located versus the connection of the member that is to be mounted, to go into the cylindrical pieces of patch device assembled on anchorages at the end versus the connection of the prestressed concrete member, earlier mounted, the screwing up of nuts at the back of those anchorages to the cylindrical pieces of the patch devices after mounting all the prefabricated members, being performed a strong pressing of patch devices on anchorages by a simultaneous screwing up of the two nuts of the patch devices by means of two fixed wrenches;

Transfer devices which in one construction variant, are of parallelepipedic shape with a cylindrical hole with a diameter a bit greater than the diameters of reinforcement openings, composed of a U shaped steel wedge with two slopes placed between two lateral wedges, also of U shape, with a slope only, and of two steel pieces which are filling in the spaces between the arms of the U wedges beveled only on one side and which are assembled by means of one rib-system and of some flange with sewer as well as by means of two screws which are to be screwed up at their thinner frontal part of the middle wedge, and in another construction variant they are made of two wedges which are beveled on two faces and which are placed between two steel pieces, each of them being cut by a plane passing through the axes of the reinforcements and beveled only on the inner face, with cylindrical holes having their axis within sectioning plane and are assembled by means of some ribs placed to the edges of exterior pieces at their inner side and of some flanges having openings laterally located to the middle wedges at their upper and lower part, as well as by means of some screws which are screwed up in one of the central wedges, to pass through the cylindrical holes provided in the other wedge, and are fixed by means of some nuts, the drawing out of transferring devices, placed below anchorages being performed by means of usual presses the piston of which having a central longitudinal cavity, through the screwing up a steel rod into the middle wedge and placing a U shaped support, with a central cavity of somewhat long shape in its plane of symmetry, on the marginal wedges of the transfer device so that the rod could pass through somewhat long shape cavity of the support on which the press is placed, so that the rod passes through its axis, and is fixed by means of one nut which is introduced at the free end of the rod and is pressed until it becomes tight on the press piston and then, by unscrewing up the assembling screws of the device and actioning the by beams of a pump until the middle wedge begins to slide between the marginal wedges of transferring device; in the second construction variant, instead of the U shaped support, two rods are used that pass through the holes of that wedge in which the traction-rod has been screwed up, and is supported on the other wedge.

An example of application of the procedure and of assembling means by prestressing, according to the invention, in view of executing some prestressed concrete continuous beams having polygonal and linear axis these beams being made of prefabricated concrete units is given in what follows, in the assumption that the post-tensioned reinforcement is achieved from a single wire-cable referring also the FIGS. 1–7 that represent:

FIGS. 1a, b and c represent a schematic presentation of the performing stages of a continuous beam with a polygonal upper sole;

FIGS. 2a, b and c represent the same for a continuous beam with linear upper sole;

FIG. 3 represents a view of a connecting device;

FIG. 4 represents a view of a fixed key type necessary to stress the connecting devices on anchorages;

FIG. 5 represents two views a and b of a transfer device;

FIG. 6 represents a perspective view of another kind of transfer device;

Figure 7A:
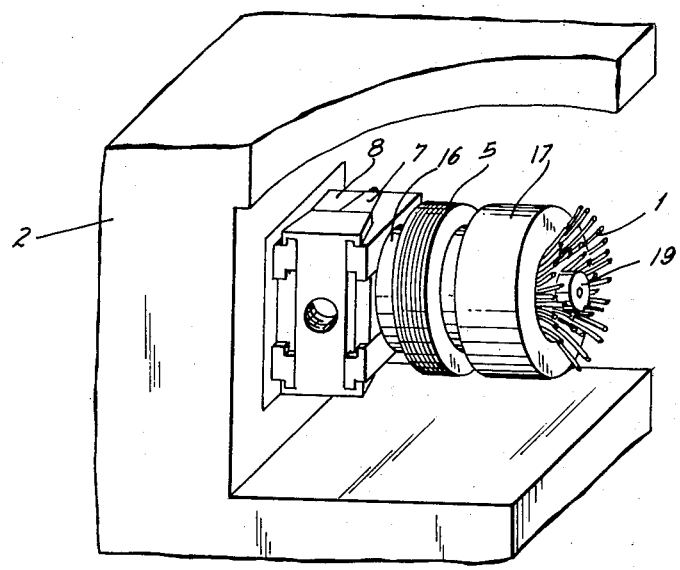
FIG. 7 represents six stages (steps) a, b, c, d, e and f of the realization of a connection between two prestressed concrete precast members.

According to the invention, the assembling by means of prestressing with post-tensioned reinforcement 1 achieved from some wires a, of a structure achieved from units 2, made from precast concrete, can be made in two stages.

In the first stage, the units 2 are to be assembled on the ground over the table 3 in prestressed concrete members, in the case of the invention, in boundary beams (FIG. 1a and FIG. 2a) and central beams (FIG. 1b and FIG. 2b).

In the second stage, the prestressed concrete elements carried out in the first stage are to be assembled in structures of prestressed concrete. This is done when applying the invention for prestressed concrete continuous girders, by disposing these elements (boundary and central girders) on supports end to end (FIG. 1c and FIG. 2c) so that some space should remain between them by the connection of reinforcement 1, by the filled up the space-joints among the beams with mortar or concrete and the achievement of the continuity of the prestressing force in the connected reinforcement 1 and the connecting zone prestressing.

In view of the assembling achievement, some connecting devices of reinforcement and some devices for the transfer of the prestressed forces developed by post-tensioned reinforcement on the prestressed concrete member tops to the connecting devices are necessary.

A connecting device of two post-tensioned cables is carried out (FIG. 3) by a cylindrical piece 4, realized of steel pipe, inside threaded at the both ends provided with a hole c in the lateral wall in order to check the injection, and two screw nuts 5 in form of cylindrical washer also realized of steel pipe d, threaded on the outer lateral sides, and on one of the front sides the nuts are provided with cylindrical holes e or radial notches having rectangular section. In order to stress the screw nuts 5, a fixed key 6 is used (FIG. 4), provided on one side with cylindrical pegs f or with ribs having a rectangular section.

A transfer device (FIGS. 5a and b) is realised with a central wedge 7, U shaped, having two slopes, disposed between two lateral wedges 8 (also U shaped) having only one slope. They form a rectangular parallelepiped with a central cylindrical hole g by addition of two metallic pieces 9 at the lateral wedge arms 8.

The assembling of the device is made by means of some ribs h disposed on the elements 8 and of some flanges i with channel j corresponding to the ribs h, disposed on the upper part and on lower part of the wedge 7 as well as by means of two screws 10 which are threaded to the thinner front part in the arms of the wedge 7.

In another constructional form (FIG. 6), the transfer device is achieved of two wedges 11, U-shaped, having two slopes, arranged between the steel elements 12, having slopes only to the wedges 11, and forming together a rectangular parallelepiped having a central cylindrical hole $k$; the elements 12 being sectioned after a plane passing along the transfer device by the axis of the cylindrical hole $k$, the assembling being made by means of some ribs $l$ disposed at the inner borders of the elements 12 and of some flanges $m$ provided by the channels $n$ corresponding to the ribs $l$ disposed at the upper and lower part of the wedges 11, as well as by means of the screws 13 stressed in one of the wedges 11, pass by cylindrical holes performed in the other wedge and are fixed by means of some screw nuts 14.

The assembling in the first stage of the units 2 in prestressed concrete elements is made as follows:

the concrete precast units which make up an prestressed concrete member are setting end to end on a platform 3, so that the continuity of the each longitudinal channel $p$ for post-tensioned reinforcements should be assured and that it should remain between them the spaces $r$ with sizes 1–2 mm.

the spaces between units will be partially filled up with cement mortar (FIGS. 1a and b and FIGS. 2a and b) on such height that each of the cross-section of the partially filled up spaces should have one of the central nuclesu limits, the nearest to the post-tensioning reinforcement, at the level of the application point of the prestressed force at transfer (taking into account—when determining it—of the loading effect from member eigenweight, when it is the case);

after the mortar hardening in the spaces, the cables 1 are introduced into channels for the element prestressing;

in the ends that come out of the channels (FIG. 7a) the cable will be coated with fragments of thin pipe 15, with their external diameter equal with the inner diameter of the channels $p$ which are fixed into the concrete by inserting them into the channels $p$ on an adequate depth;

on each of the fittings 15 is put on transfer device, central cylindrical hole $g$ of which has the diameter equal with the washer channel diameter $p$ and, also, a thick washer 16 made of a thick wall steel pipe, that may be made up from two semicylindrical pieces too; over each of the washer 16 it must be introduced a nut 5 of the cable connecting devices; the inner diameter of the washer 16;

later on, it will be introduced the steel anchorages of ring 17 and a double cone 19, 20 type it is well that the anchorage rings 17 to be located by means of a templet well fixed at the ends of the beam, and maintained as long as lasts the pretensioning operation of all the cables;

then, the cable prestressing and anchorages 17, 18 and 19 are carried out, by common means;

after prestressing and anchoring the wires ends are bended and cut so that they do not exceed the outward edge of the rings 17 of the anchorages;

at these thus obtained prestressed concrete members the spaces between units are completely filled up with cement-mortar.

Figure 7B:
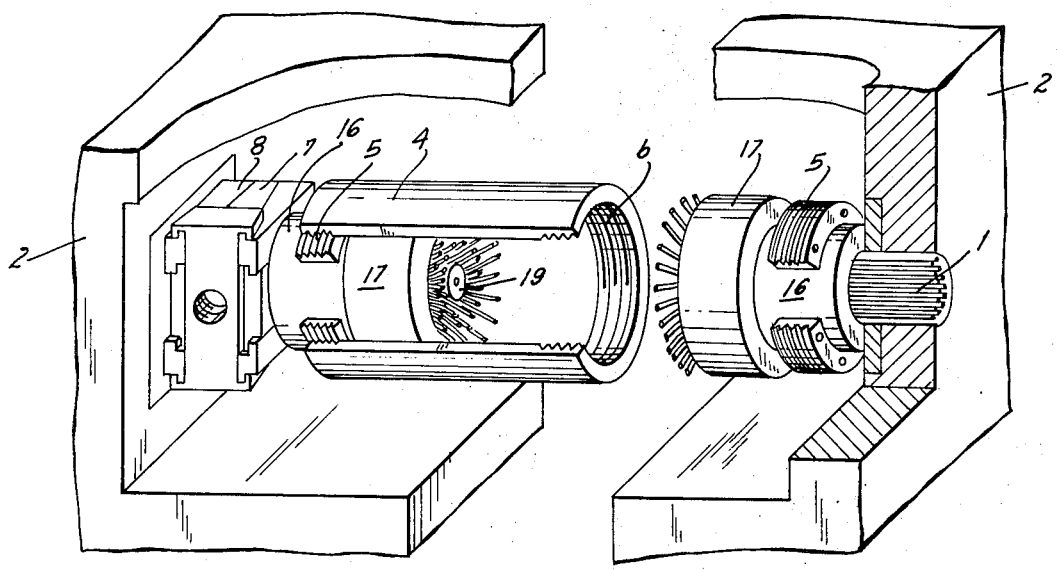
Figure 7C:
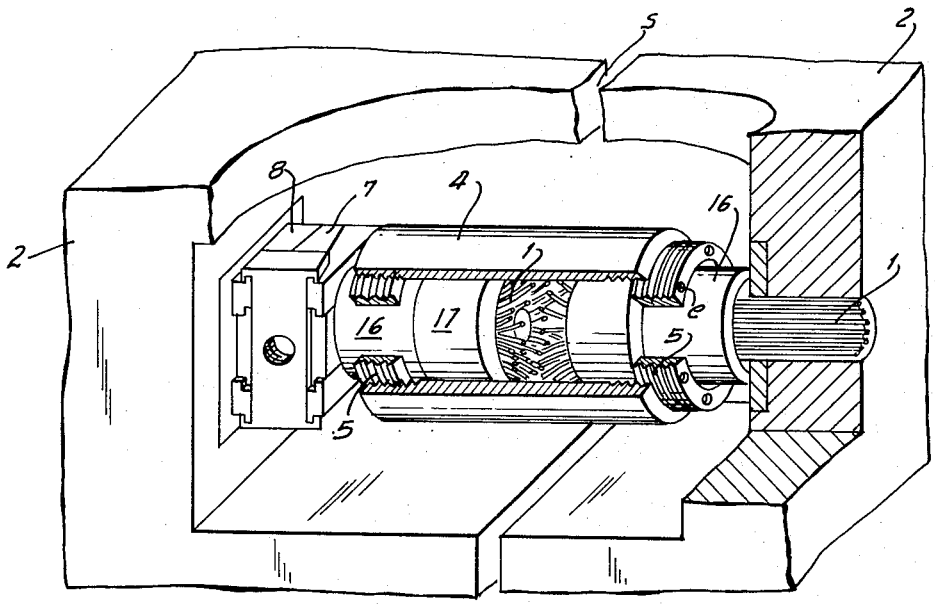
Figure 7D:
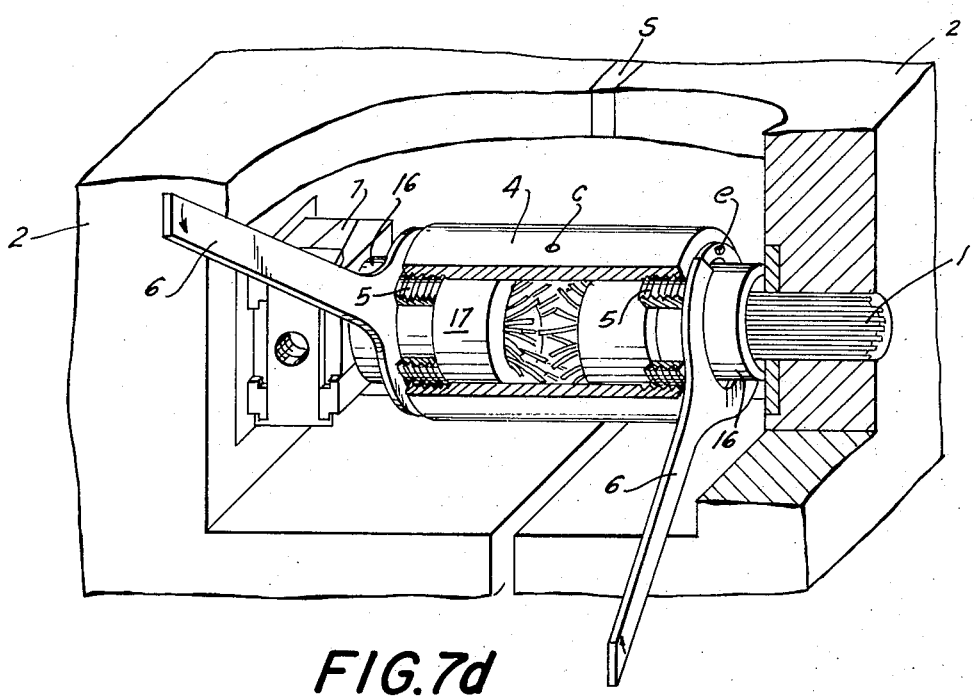
Figure 7E:
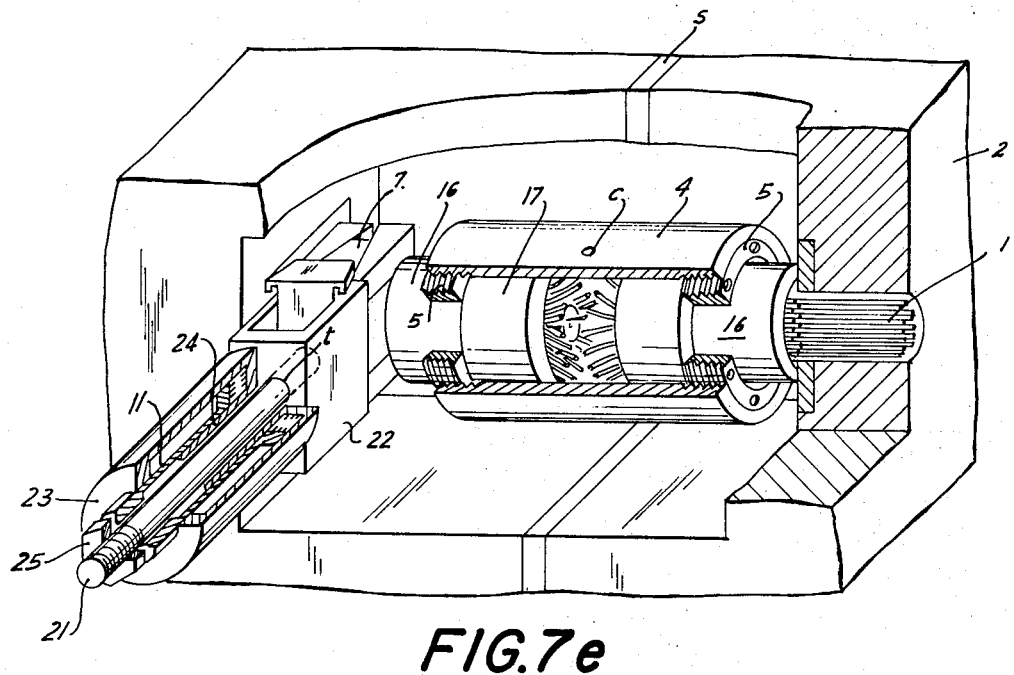

With the prestressed concrete members made up in first stage, having post-tensioning reinforcements without any bond some resistive structures are assembled in a second stage, in the case of the invention application example these structures are continuous prestressed concrete beams. The assembling is made as follow:

one of border beams is transported and is placed on supports 20 at the time of the preparation for assembling, or after assembly on supports, the anchorages to next span of the continuous beams are covered with the cylindrical pieces 4 of the connection devices which are screwing up at the nuts 5 from the back side of the anchorages (FIG. 7b); considering the possible errors of execution, the inner diameter of the cylindrical pieces 4, the external diameter of the nuts 5 respectively must be 2–3 mm. bigger than external diameter of the rings 17 of the anchorages;

then, it is brought the beam for next span, which shall be placed on supports so that his anchorages to enter the cylindrical pieces of the connection devices from the end of the previously assembled beam (FIG. 7c); between the two beams a space $s$ of 1–2 cm. is remaining;

then, the nuts 5 from the back side of the anchorages of the second member mounted into structure are screwed up to the cylindrical pieces of the connection devices and by means of two wrenches 6, the nuts 5 of the connection devices (FIG. 7d) are squeezed as much as practically possible on anchorages;

in the same way, successively the other elements of the continuous beam are successively assembled;

then the joint spaces $s$ between the beams are partially filled up with cement mortar (with high initial strengths, preferably expansive) on such a being that each of cross-sections of the partially filled up spaces should have one of central nucleus limits, the nearest to the post-tensioned cable connection devices at the gravity center level of the connection devices cross-section;

after the mortar has hardened in the spaces, the extension cable connection devices and simultaneously the assembling zones between the precast prestressed concrete members are prestressed by extraction of the transfer devices from under anchorages, in this way being realized the continuity of the prestressing force in the connected cables at the joining levels.

Figure 7F:
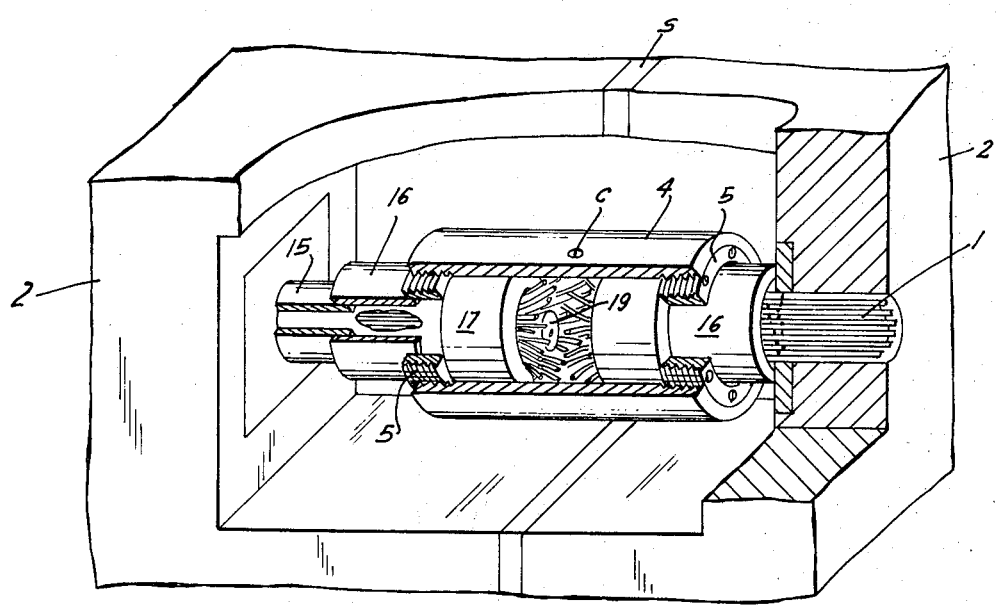

The drawing out the transfer devices as are shown in FIG. 5 is carried out as follows; a steel rod 21 is screwed up in wedge 7, of which both ends are threaded, after that, it is placed on the wedge ends 8 a support 22 of U-shape, with a hole $t$ lengthened along its symmetry axis so that the rod 21, which is supporting it, to pass through this hole $t$; then, it is mounted a hydraulic jack 23 with a piston 24, with central hole $u$, by its location on support 22 so that rod 21 passes through the axis of the jack and by tightening the nuts 25 which are introduced through the free end of the rod 21; the screws 10 of the transfer device are unscrewed and the hydraulic jack 23 is actuated until the wedge 7 starts to slip and then it is drawn out; in that moment the prestressing force in the cable beneath which the anchorage transfer device has been pulled out, is transmitted to the cable with which it is patched up, by means of the connection device, while the prestressing force developed by the two connected cables is transferred from the level of anchorages to the level of the whole space between the prestressed concrete members that are to be assembled; after drawing out the wedges 7 the wedges 8 and 9 of the transfer devices (FIG. 7f) will be also taken out as well as the washers 16 when they are made up from two pieces.

After drawing out of the transfer device, the joint spaces $a$ between elements will be filled up completely with initial high strength cement mortar, preferably mixed up with expansive cement.

After the mortar hardening and after loading with permanent loads the prestressed concrete structure that is so made up the channel will be tightened in the joining zones; then the channels will be injected with cement mortar and the inner spaces of the connection devices and it will be cast-in-place with concrete the grooves in which are found up the connection devices; the following operations have been previously achieved; the wrapping up with networks of steel bars of the connection devices, the joining by superposition or by welding of the joining bars of mild steel in the grooves, and the stirrups assembling on them lengths.

The proceeding and the means of assembling by prestressing the engineering structures made up from prefabricated concrete units, according to the invention, show the following advantages;

the prestressed cables of the precast structures may be placed in the same location as by the usual monolithic non-precast structures also in the cases when the bending moments in the joint zones during of the transfer are zero or they have small values, thus resulting an important saving of steel;

they permit the use of the post-tensioned cables belonging to the prefabricated prestressed concrete members for introducing some advantageous initial states of tensions in the joints between members and for taking in the stresses produced by the external loads which appear after the assembly has been executed, which results in reducing the steel and concrete consumption and the ensuring a better behavior of the obtained structure under the loading action they assure the possibility to realize by common means and simple recoverable transfer devices, the assembling—with initial favorable stresses into the joints—of the precast prestressed concreate members having large widths and prestressed reinforcement for high and quite high precompressing forces;

the consumption of materials, equipments and manual labor for the carrying out the assembling joints is the smallest possible;

the assembling workings are made in labor-protection conditions much better than in the case of using the known methods.

I claim:

1. A method of making a prestressed beam structure, comprising the steps of:
    (a) spacedly aligning a multiplicity of precast concrete elements having throughgoing passages to form a beam with the passages thereof forming a throughgoing longitudinal channel;
    (b) filling the spaces between said elements with a cement mortar;
    (c) passing a tensioning cable through said channel and causing it to emerge therefrom at a terminal element at one end of said beam and anchoring said cable at a terminal element at the other end of said beam;
    (d) mounting a wedge assembly around an emergent end of said cable at said one end of said beam, said wedge assembly having at least two rigid members laterally removable from said end of said cable and relatively shiftable transversely thereto to spread said members apart, one of said members bearing against said terminal element at said one end of said beam;
    (e) applying to said end of said cable beyond said wedge assembly a force-transmitting sleeve surrounding said cable and bearing at one end thereof against the other of said members, an externally threaded ring surrounding said sleeve, and a self-tightening cable clamp beyond said sleeve and engageable by the other end thereof, said cable clamp having an external diameter greater than the internal diameter of said ring but less than the external diameter thereof;
    (f) relatively displacing said members transversely to tension said cable against said terminal elements subsequent to the hardening of said cement mortar in the spaces between said elements;
    (g) erecting said beam and spacedly aligning same with a similar beam having an externally threaded ring mounted on its tensioning cable inwardly of a cable clamp of the similar beam;
    (h) drawing said rings together by threadedly inserting same into a common pipe internally threaded at its ends;
    (i) introducing a mortar into the space between said beams;
    (j) tightening said rings in said pipe upon the hardening of the mortar introduced into the space between said beams, thereby transmitting tensile force between the cables of said beams;
    (k) laterally withdrawing said wedge assembly; and
    (l) introducing concrete into the channels of said beams around said cables, into the space originally occupied by said wedge assembly and around said pipe.

References Cited

UNITED STATES PATENTS

| | | | |
|---|---|---|---|
| 3,089,215 | 5/1963 | Stubbs | 52—223 |
| 3,387,417 | 6/1968 | Howlett | 52—223 |
| 3,422,592 | 1/1969 | Gjerde | 52—223 |
| 2,155,121 | 4/1939 | Finsterwalder | 52—225 |

FOREIGN PATENTS

| | | | |
|---|---|---|---|
| 642,128 | 5/1961 | Canada | 52—174 |

HENRY C. SUTHERLAND, Primary Examiner

J. L. RIDGILL, JR., Assistant Examiner

U.S. Cl. X.R.

264—261; 52—227; 254—29 A